J. E. SCHUMACHER.
BRAKE FOR RAILWAY VEHICLES.
APPLICATION FILED JUNE 29, 1908.
916,614.
Patented Mar. 30, 1909.
2 SHEETS—SHEET 1.
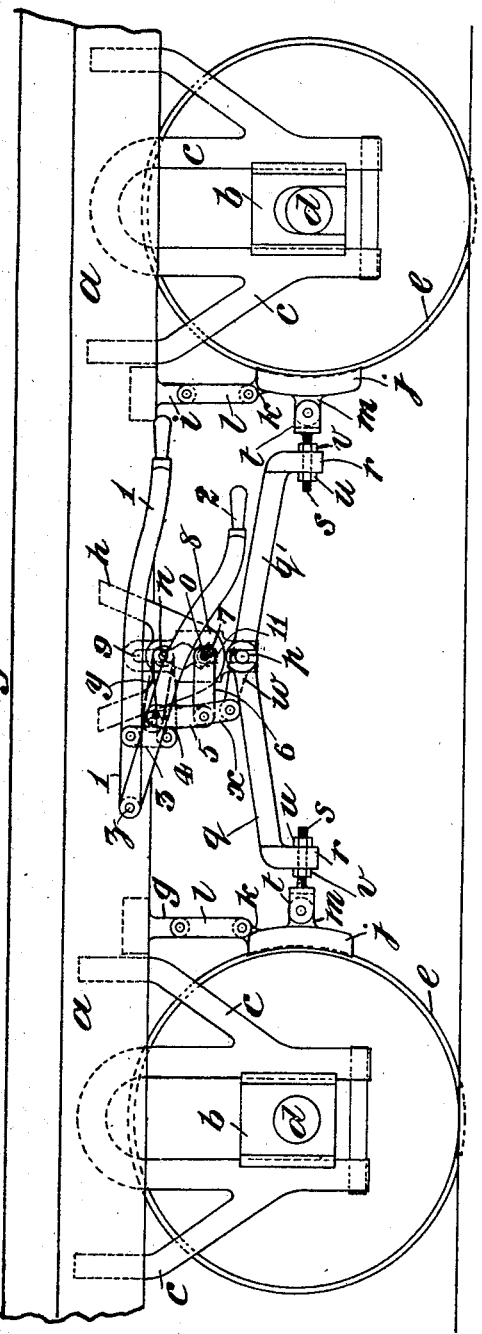
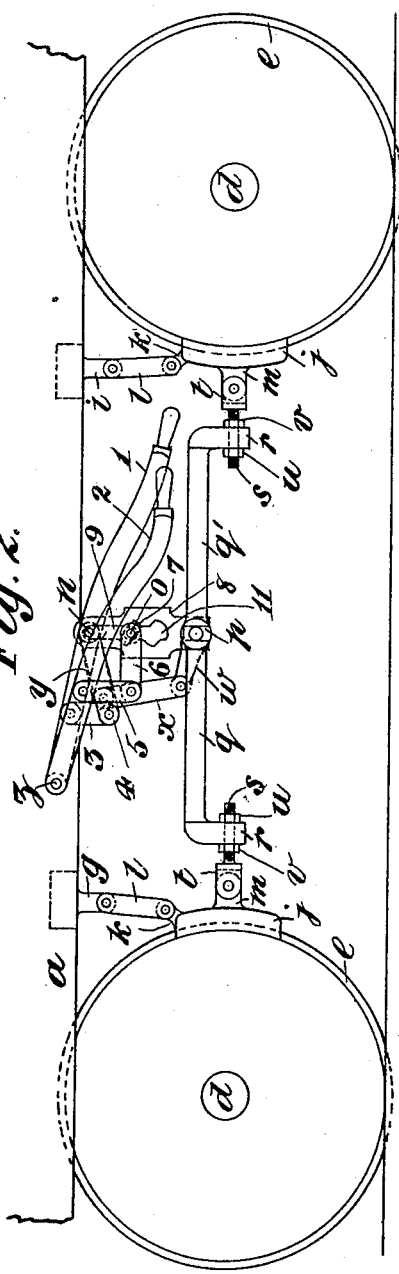
Witnesses:
William Sadler
Harry Benson Cranage
Inventor.
James Edward Schumacher
by
H. Fairburn Hart
Attorney.

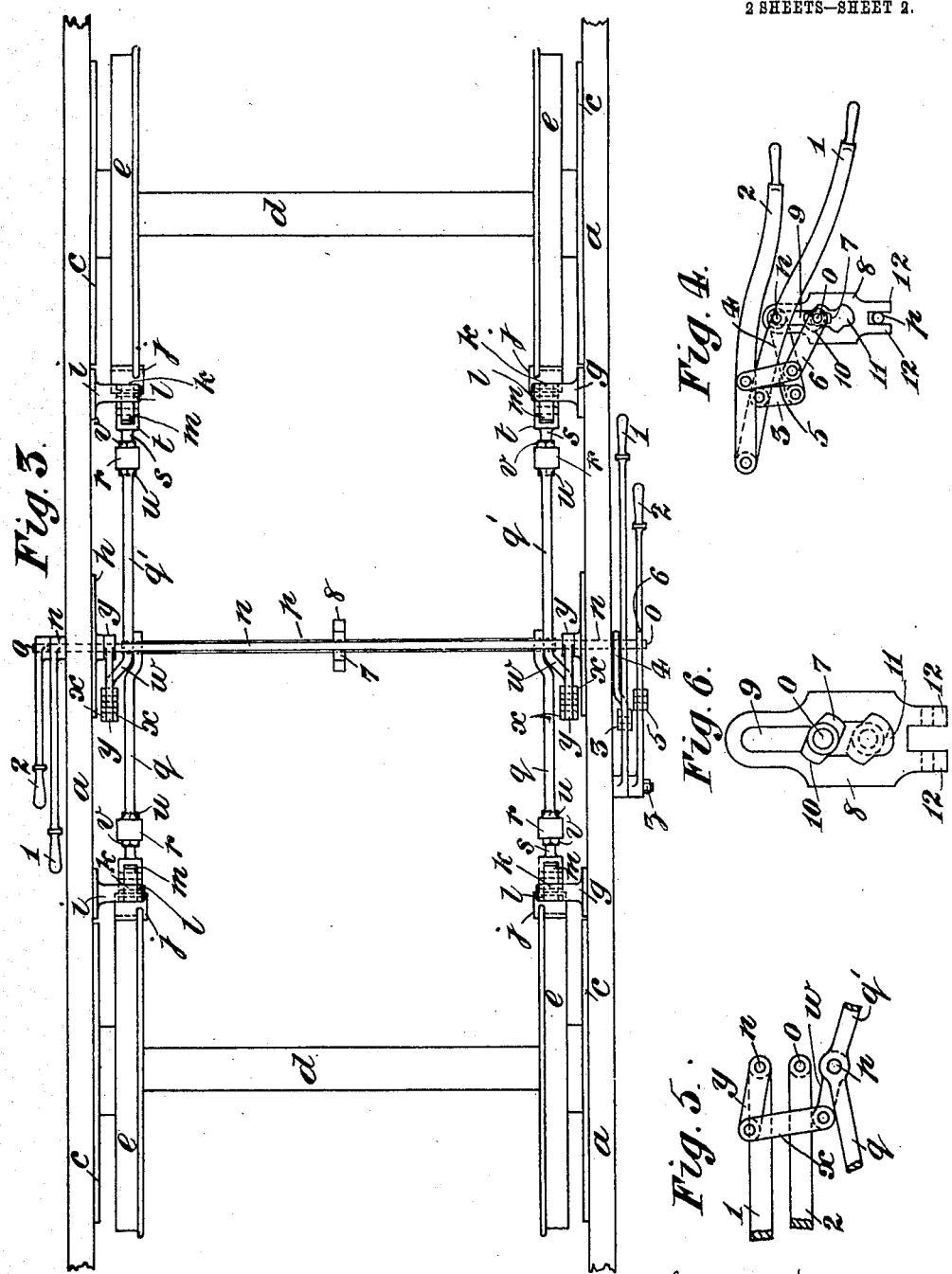

UNITED STATES PATENT OFFICE.

JAMES EDWARD SCHUMACHER, OF YORK, ENGLAND.

BRAKE FOR RAILWAY-VEHICLES.

No. 916,614.　　　　Specification of Letters Patent.　　　Patented March 30, 1909.

Application filed June 29, 1908. Serial No. 440,922.

*To all whom it may concern:*

Be it known that I, JAMES EDWARD SCHUMACHER, a subject of the King of Prussia, residing at 68 Vyner street, Haxby Road, York, in the county of York, England, have invented new and useful Improvements in Brakes for Railway-Vehicles, of which the following is a specification.

This invention relates to improvements in brakes for railway wagons and other vehicles, hereafter termed "the vehicle."

The object of this invention is to provide a brake which may be brought into operation on either side of the vehicle by hand, that is, the brake may be brought into action by a hand lever from either side of the vehicle, and by a second and similar lever thrown out of action when required on either side of the vehicle, irrespective of the side from which it has been applied. Further, and when required, in addition to the hand arrangement, provision may be made for the brake or brakes to be applied automatically, for example, say, by a cord, the ends of which are respectively connected to the engine and brake van, or by lever or other connections with the buffers, so that when the latter are pressed inward the brake or brakes will be applied to the wheel or wheels, and when the buffers resume their normal positions, the brake or brakes will be withdrawn from the wheel or wheels.

The hereinafter described brake provides sufficient pressure on the wheels for general braking purposes by its mere weight as soon as the releasing lever allows it to fall into contact with the wheels. Further, the pressure can be increased by the brake lever, and the brake can also be instantly and readily released from its contact with the wheels and locked in a raised position.

In the drawings hereunto annexed, although the invention is shown applied to a railway wagon, I would have it understood that its use is not limited thereto, but it may be adapted for other purposes and applied to road or other vehicles.

Figure 1. is a part side elevation of a railway wagon with the brakes in an "off" position. Fig. 2. a side elevation of the same, but with the brakes "on". Fig. 3. a plan of same. Fig. 4. a part elevation of levers and links showing their position when the brakes are in contact with the wheels, but not locked thereon. Fig. 5. an elevation of link connections shown on the upper part of Fig. 3. Fig. 6. an enlarged elevation of slotted lever or arm employed for the brakes and operating mechanism in an "on" or "off" position.

Like parts in all the views are marked with similar characters of reference.

$a$ is the framework of a railway wagon; $b, b$, the axle boxes; $c, c$, the pendent brackets in which the axle boxes work; $d, d$, the axles; $e, e$, the wheels mounted upon the axles. All the above mentioned parts are of ordinary and well known construction.

To the framework $a$ and between the wheels $e, e$, are fixed a number of pendent brackets, say, for example, three on each side of the vehicle. The brackets are marked respectively $g, g, h, h$, and $i, i$. The pendent brackets are fixed at a suitable distance from each pair of wheels. The center brackets $h, h$, are shown fixed at or about the center of the vehicle, but this position may be varied as circumstances require. It is also shown longer in length,—but not necessarily so,— than the other two brackets $g, g$, and $i, i$. In each of the pendent brackets $g, g$, and $i, i$, is provided an axial bearing, and two of such bearings are provided in each of the center brackets $h, h$. The number of bearings, however, in each bracket may be varied as occasion requires. A brake block $j$ is provided for each wheel $e$ or each side of the vehicle. Each brake block $j$ is provided with a lug or projection $k$ on its upper portion by which it is connected to one of the brackets $g, g$, or $i, i$, by, say, a pair of suspension links $l$. Each brake block $j$ is also provided with a second lug or projection $m$ at its rear or back portion for purposes to be hereafter described. The brake blocks $j$ are moved simultaneously in or out of action.

In the axial bearings of the center brackets $b, b$, are respectively mounted the shafts $n$ and $o$. The shaft, hereafter termed "the brake shaft $n$," is mounted in the upper bearing, and the second shaft, hereafter termed "the releasing shaft $o$," is mounted in the second bearing. The shafts $n$ and $o$ are made to extend across the wagon, as shown at Fig. 3. At the lower end of the slotted lever 8, is mounted a rectangular bar $p$,— which extends across the wagon,—provided with circular ends which pass through the lower bearings and upon which the inner ends of the connecting levers $q, q^1$, are mounted. The outer end of each of the levers $q, q^1$, is enlarged and turned downward at or about a right angle to its main portion. The turned down portion $r$ of each lever $q$, or $q^1$, forms a bearing through which passes the adjustable bolt $s$. The bolt $s$ is provided with a bifurcated end $t$ adapted to engage with and be secured to the lug or projection $m$ of the brake block. On the opposite end of the bolt $s$ are mounted the lock nuts $u$, $v$, whereby after the position of a brake block has been adjusted as required, it may be firmly secured to a lever $q$, or $q^1$, by the said nuts being screwed respectively against each side of a turned down portion $r$. The inner end of each of the levers $q^1$ is prolonged beyond its point of connection with the bar $p$ to form a lever $w$, by which it is attached by links $x$ to a lever $y$ mounted and fixed upon the brake shaft $n$. The connections of the said shafts, levers, and links is clearly shown in a detail view at Fig. 5.

On a pin $z$ fixed to the framework $a$ are mounted the brake lever 1 and the releasing lever 2. The brake lever 1 is connected on one side of the wagon by links 3 to a lever 4 mounted and fixed upon the brake shaft $n$, and the releasing lever 2, at the same side of the wagon by links 5 to a lever 6 mounted and fixed to the releasing shaft $o$. On the opposite side of the wagon the brake lever 1 and releasing lever 2 are mounted and fixed respectively upon the brake shaft $n$ and releasing shaft $o$ with their outer ends in the opposite direction, thus dispensing with the use of the links 3 and 5, and levers 4 and 6. That is to say, if the levers 1 and 2 on one side of the wagon point to its right hand end, the levers on the opposite side will point to its left hand end. By dispensing with the said parts, it enables the brakes to be applied or released from either side of the wagon, and it also enables the levers 1 and 2 to be moved simultaneously up or down on both of its sides, thus indicating to the shunter by the position of the levers whether the brakes are "on" or "off." At the same time in a series of wagons, a uniform position of the levers is obtained, with what are known as "crosscornered" brakes, that is, the said levers 1 and 2 for operating the brakes, will be to the right of a man when facing the wagon side.

On the releasing shaft $o$ (Figs. 1, 2, and 6) is mounted one or more double ended cams 7. At Fig. 3, one cam piece 7 is shown at or about the center of the wagon, but when required, a cam may be provided at each end of the releasing shaft $o$ on the outside of the framework $a$. The cam 7 is arranged to work within a lever 8 slotted and shaped as shown at Fig. 6. This lever forms an important feature of this invention as it enables the cam 7 to lock the brakes and their operating mechanism in either an "on" or "off" position. The lever 8 is provided with a long slot hole 9 having two enlarged curved and inclined recesses 10 and 11 formed therein.

The parallel portion of the slot hole 9 is made in two widths, that is, the parallel portion of the slot hole above the cam 7,—as shown at Fig. 6,—is of such a width as to allow the brake shaft $n$ to slide freely therein. Below the recesses 10 the parallel portion of the slot hole is made wide enough to permit the boss of the cam to slide freely therein. The recess 11 is below and in communication with the enlarged portion of the slot hole. The recesses 10 are formed by cutting or otherwise removing a portion of the lever on each side of the slot hole 9. The recesses thus formed are partly inclined and partly curved so as to fit the inclined and curved ends of the cam 7. The lower recess 11 is formed by removing curved and inclined portions from the lever 8 on each side of the enlarged portion of the slot hole and also at its bottom. The recesses 10 and 11 are of such a size as to permit the cam piece 7 being turned, say, one fourth,—more or less,—of a revolution therein. The lever 8 is bifurcated at its lower end to enable it to be, say, bolted to the bar $p$. If desired, the slotted lever 8 may be mounted and fixed upon bar $p$ or its circular ends by means of a boss and a key. After the brake shaft $n$ and releasing shaft $o$ have been passed through the slot hole 9, the bifurcated end 12 is fixed in position upon the bar $p$. The upper loop portion of lever 8 acts as a guide for the movement of the inner ends of the levers $q$, $q^1$. It will be seen that the recesses 10 and 11 are curved in the direction of the rotation of the cam 7.

The brake lever 1,—the longest lever and nearest to the side of the framework $a$,—and the releasing lever 2,—the outer and shorter of the two levers,—are arranged to work between suitable vertical guides not shown in the drawings, but of ordinary construction.

The action of the apparatus is as follows:— When the brakes are "off" the brake lever 1 is raised to the horizontal position, shown at Fig. 1. The releasing lever 2 is then at its lowest position. The slotted lever 8, levers $q$, $q^1$, $w$, $y$, 4, and links $x$, 3, are all raised to the highest position. The recess 11 in the slotted lever is then raised to enable the cam 7 to be turned therein at an angle across the slot hole, as shown at Figs. 1 and 6, thereby enabling its curved and tapering ends to engage with the curved and inclined portion of the recess for holding the said parts in a raised position, and at the same time locking the brakes in the "off" position. As soon as the releasing lever 2 is raised to the position shown at Fig. 4, the cam 7 will have been turned out of recess 11 into a vertical position. As soon as the ends of the cam are moved clear of the curves and inclines of the recesses the slotted lever 8, by the weight of the brakes and levers and links attached thereto, is made to descend until the brakes $j$, $j$, are in contact with the periphery of the wheels, and the top of the slot hole 9 will then be within a short distance of the upper surface of the brake shaft n. When the slotted lever 8 descends the brake lever 1 is simultaneously carried down with the levers $q$, $q^1$, and as the latter turn on the circular ends of the bar $p$, and their outer ends move outward in opposite directions, the brake blocks $j$, $j$, are carried toward the wheels $e$, $e$. The weight of the operating mechanism is sufficient to provide the necessary pressure on the wheels for general braking purposes. In this position the braking lever is down while the releasing lever 2 is raised.

When it is required to put extra pressure upon the brakes and to lock them in the "on" position, the brake lever 1 is pressed farther downward, and simultaneously the slotted lever 8 is caused by levers $y$, $w$, and link $x$, and by the connection of lever 8 with bar $p$, to further descend until cam 7 is opposite to the recess 10. The cam 7 is then caused to turn,—by the descent of the lever 2 and weight of the parts connected therewith,—in the recess 10 into the angular position across the slot hole 9,—as shown at Figs. 2 and 6,—with its curved and tapering ends in engagement with the curved and inclined portions of the said recess for firmly locking the brakes $j$, $j$, in the "on" position. Both of the levers 1 and 2 are then down.

To release and withdraw the brakes, the releasing lever 2 is first raised for turning the cam 7 into a vertical position for allowing the slotted lever 8 to slide freely when the brake lever 1 is raised to the position shown at Fig. 1. When the brake lever 1 reaches this position, the releasing lever 2 falls as soon as the cam 7 is free to enter the recess 11 and to turn therein, while the said lever 2 continues to descend to its lowest position. The brakes $j$, $j$, are retained and locked in the "off" position by the cam's engagement with curved and inclined portions of the recess 11.

In the above described arrangement the releasing and brake levers are described as being operated by hand, but when required,—though not necessarily so,—they may be automatically applied when a train of wagons is fitted with this apparatus. The releasing levers and also the brake levers,— if so desired,—are then provided with one or more loops or eyes through which a cord is made to pass from the engine to the guard's van in a zig-zag direction, first, through an eye fixed to the upper portion of each wagon, then through the loop or eye of the releasing lever, and back to a second eye at the top of the wagon, from which it passes to the eyes of a second wagon, and so on throughout the full length of the train. One or both ends of the cords may be secured to one or more windlasses on either the engine or guard's van, or both. A continuous or jointed cord may be employed for each side of the wagon, or both cords may be on one side of the same. The cord on one side is attached to the releasing levers, and the cord on the other side is attached to the brake levers. The cord on the releasing levers may be slacker than the other one. Should the wagons break away from the remaining ones, say, in going up or down an incline, the cord attached to the brake levers will first part asunder, and the other cord will be tightened before it breaks, whereby the releasing levers will be raised, thereby allowing the slotted levers and brakes to descend and the latter to be automatically applied to the wheels of each wagon of the runaway and other portion of the train.

I claim:—

1. In brake actuating mechanism for vehicles, the combination with the wheels and body portion of the vehicle of brake blocks suspended by links from the said body portion, levers for connecting the brake blocks on each side of the vehicle together, said levers being pivoted to a central shaft and levers for operating the brake blocks simultaneously from either side of the vehicle.

2. In brake actuating mechanism for vehicles, the combination of the wheels mounted upon axles, a brake block for each wheel pendently suspended by links from the body of the vehicle, an adjustable lever attached to the brake block on each side of the vehicle and pivoted together at their centers, a central shaft for connecting the said levers together and means for operating the brake blocks simultaneously, as set forth.

3. In brake actuating mechanism for vehicles, the combination with the body portion and wheels of the vehicle of a brake block pendently suspended by links from the said body portion, adjustable levers pivoted together at their centers, whereby the brake blocks on each side of the vehicle are connected together, a pair of transverse shafts supported in bearings on the body portion of the vehicle, and upon one of which the said adjustable levers are jointed, three transverse shafts arranged one above the other extending across the vehicle, upon the lower one of which the said adjustable levers are jointed, a pair of levers mounted respectively on one side of the vehicle upon the other two transverse shafts, a second pair of levers mounted on the opposite side of the vehicle upon a separate spindle, levers attached to the said transverse shafts and links for connecting them respectively to the last named pair of levers for operating the brake blocks as set forth.

4. In brake actuating mechanism for vehicles the combination of the body portion mounted upon wheels a brake block for each wheel pendently suspended by a link from the said body portion, adjustable levers connected together at their centers for attaching the brakes on each side of the vehicle together, a transverse shaft extending the full width of the vehicle, to which the adjustable levers are connected, levers mounted at distances apart upon the said shaft, a pair of transverse shafts mounted at distances apart above the first named transverse shaft, one of which shafts is provided with projecting arms, links for connecting the arms of the said transverse shafts together, operating levers mounted on one side of the vehicle upon the pair of transverse shafts, a double ended cam mounted upon one of the shafts and adapted to engage with a slotted and recessed cam piece for locking the brake blocks in or out of position, a second pair of levers mounted upon the opposite side of the vehicle for actuating the brake, as set forth.

5. The combination of three vertical shafts arranged one above the other at distances apart, brackets for attaching the said shafts to the body of the vehicle, a cam piece mounted upon the center transverse shaft, a slotted and recessed cam piece having a forked end adapted to engage the lowest transverse shaft, while the slotted portion of the cam piece embraces the upper transverse shaft, projecting levers mounted and fixed upon each of the said shafts, a pair of operating levers mounted upon the upper and center shafts and a second pair of operating levers mounted upon a spindle fixed to the body portion of the vehicle, and links for connecting the said levers and shafts together, as set forth.

JAMES EDWARD SCHUMACHER.

Witnesses:
WILLIAM SADLER,
ANNIE PARK.